Nov. 3, 1936.                R. D. SMITH                2,059,974
                        AUTOMATIC WHEEL ALIGNER
                         Filed July 29, 1935

ROY D. SMITH  INVENTOR.

BY
Merrill M. Blackburn
ATTORNEY.

Patented Nov. 3, 1936

2,059,974

UNITED STATES PATENT OFFICE 2,059,974

AUTOMATIC WHEEL ALIGNER

Roy D. Smith, Davenport, Iowa, assignor to Bee Line Manufacturing Company, Davenport, Iowa, a corporation of Iowa Application July 29, 1935, Serial No. 33,699

8 Claims. (Cl. 280—95)

This invention relates to a part of the steering system of an automobile and more particularly to a group of parts which function in such a manner as to cause the front wheels of a pneumatic tired vehicle to assume positions relative to each other such that said front wheels will substantially continuously be retained in true running alignment with relation to each other at the points at which the surfaces thereof contact the road.

Among the objects of this invention are to so modify the steering mechanism of motor vehicles of the character indicated that the steering wheels of the vehicle, when running, will always assume proper relative positions with relation to each other to reduce to a minimum the wear upon the tires of the vehicle; to so construct the steering mechanism of a motor vehicle that errors of wheel camber, axle caster, angle of steering arms, etc. will be automatically neutralized and that the vehicle will function properly regardless of such errors; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be interpreted in a limiting sense.

The drawing annexed hereto and forming a part hereof shows more or less diagrammatically a structure embodying my present invention. In Figs. 1, 2, and 3, the axial line of a front axle of a motor vehicle is indicated by a discontinuous line all the way across each of these three figures.

Fig. 2 represents the same structure with an excessive condition of toe-in;

Figure 1:
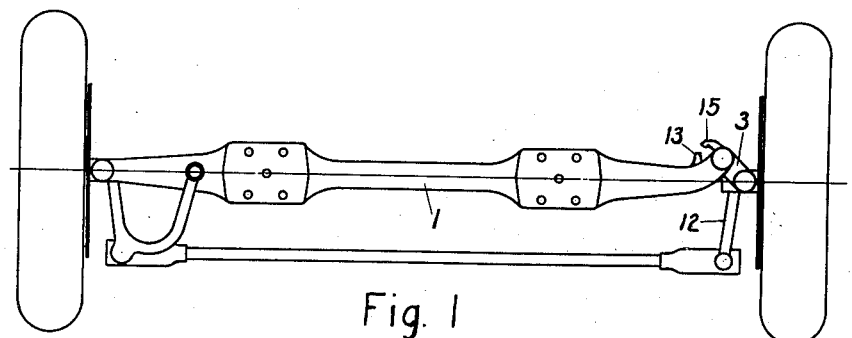
Fig. 1 represents a front axle assembly with the wheels in normal position for running straight ahead.

Reference will now be made in greater detail to the annexed drawing for a more complete description of the present invention. An axle 1 has a spindle 2 pivotally connected to one end thereof as is common practice. To the opposite end of the axle there is pivotally connected a block 3 which has holes formed therein for pins 4 and 5. As is most apparent from Fig. 5, these pins are parallel to each other. The spindle 6 is pivotally connected to the block 3 by means of the pin 5, the two being so mounted with relation to each other that the axis of the pin 5 makes a considerable angle with the axis of the spindle 6. The opening for the pin 5 is formed through arms 7 and 8 of a yoke 9 which is integrally connected with the spindle 6.

Figure 2:
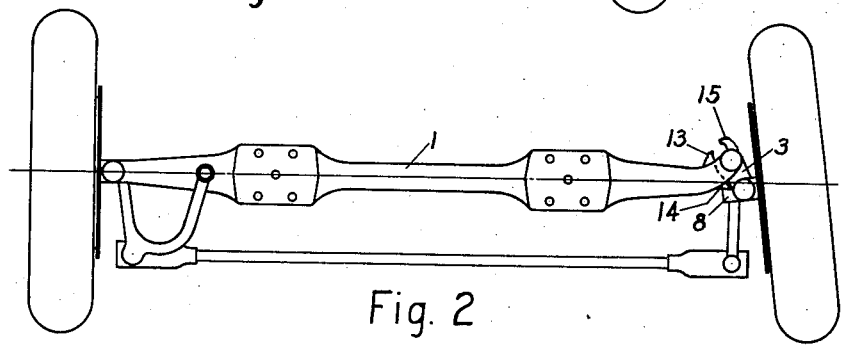
Figure 3:
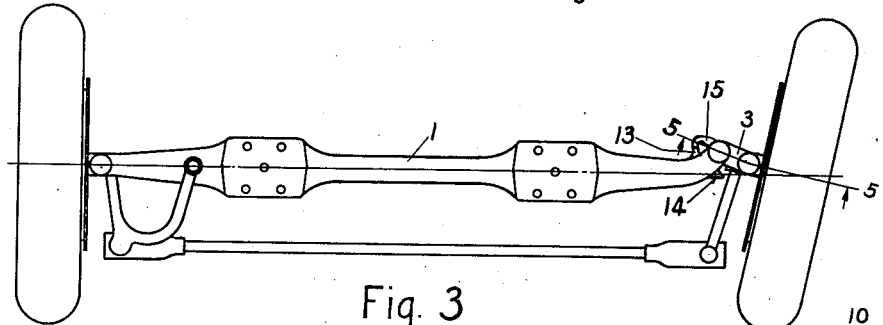
Fig. 3 represents the same structure with an excessive condition of toe-out.
Figure 4:
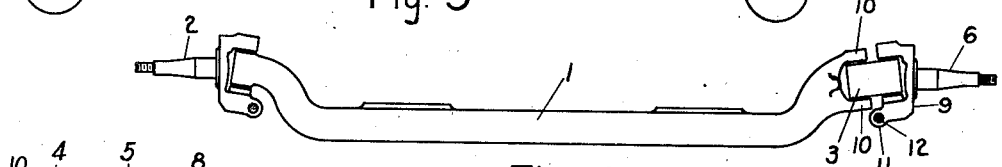
Fig. 4 shows an axle more or less diagrammatically and illustrates, in connection with Figs. 1, 2, and 3, how the right hand spindle is connected to the axle.
Figure 5:
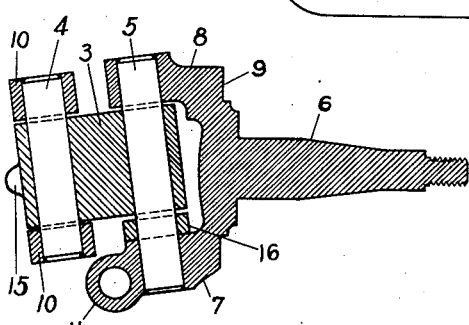
Fig. 5 shows a section taken approximately along the plane indicated by the line 5—5, Fig. 3, with the wheel omitted.

One end of the block 3 fits between the two parts 10 of the fork at the end of the axle 1. It is therefore apparent that this block 3 may pivot about the pin 4, as indicated in Figs. 1, 2, and 3. The yoke 9 and block 3 are also relatively pivotal about the pin 5. As shown in Fig. 5, the yoke 9 is provided with an eye 11 for the reception of the crank arm or steering arm 12 whereby the wheel may be toed in or toed out with reference to the axle 1 and the left hand wheel. The end of the axle is provided with stop lugs 13 and 14 to limit the amount of swing of the block 3. A lug on the block 3 cooperates with the lug 13 in limiting the amount of toe-out of the right hand wheel. The lug 14 upon the rear side of the axle 1 limits the amount of toe-in of the wheel at this end of the axle. Any suitable bearing member 16 may be provided.

In actual practice, while running on the road, the front wheels assume an approximately straight ahead position, as shown in Fig. 1, and as will be explained in connection with Figs. 2 and 3. If the vehicle should be driven with the wheels having an excessive amount of toe-in, as shown in Fig. 2, the portions of the tires, in contact with the road surface, would be forced inward toward each other, since all pneumatic rubber tires have a certain amount of flexibility. This condition would cause the outer shoulder of the tire tread, instead of the center of the tread, to be in contact with the road. Since the shoulder of the tire is less in circumference than the center of the tread, the tendency is to cause the tire to run in an outwardly curving path until the wheels are in approximate parallelism, as shown in Fig. 1. When this happens, the sidewise deflection of the tires will have disappeared and the tires will be running on the center of the tread. If the car should be driven with the tires in a toe-out position, as shown in Fig. 3, the portions of the tires in contact with the road surface would be forced out, causing the tires to run on the inner shoulders of the treads instead of on the center. This will cause the tires to run in a curved path toward each other, which will cause the wheels to become substantially parallel, as shown in Fig. 1.

As will be apparent from the appended drawing, the tie-rod is of a fixed length and the toe-in and toe-out conditions of the wheels are brought about by changing the distance between the wheels by swinging the connecting link or block 3 at one end of the axle. The block 3 is so constructed that the pins 4 and 5 are parallel, and both pins make the same angle with respect to a vertical plane. As the block 3 is rotated through its arc of travel, the spindle moves forward or backward, but its axis does not change its angular relation to a horizontal plane. Therefore, the caster and camber of the wheel remain unchanged, regardless of the position of the block 3.

The angularity of the pins 4 and 5 will tend to cause the link or block 3 to assume a straight outward position, as appears in Fig. 5, when the axle is under load and the load is supported by the spindle. This tendency is largely counterbalanced by the rolling resistance of the tire on the road which tends to force the link 3 backward, as shown in Fig. 2. Tests have proven, however, that the rise and fall of the spindle, due to the king pin angle, and the rolling resistance of the tire set up such small forces that the sidewise deflection forces in the tires can very easily control the running toe-in or alignment of the tires. Therefore, the tires always tend to run with perfect alignment and there will be no tendency to cause the wheels to start a violent vibration known as "wheel shimmy". But, if such a condition should have a tendency to start, the inertia of the wheel would overcome the shimmy force, as the wheel would have to move forward and backward with each vibration, as well as sidewise.

It will of course be understood that the specific description of structure set forth above may be departed from without departing from the spirit of my invention as set forth in this specification and the appended claims.

Having now described my invention, I claim:

1. In a front end assembly, an axle, wheels supporting the same and connected by the axle, and a flexible connection between a wheel and the axle enabling one wheel to assume a running position nearer to or farther from the proximate end of the axle.

2. In a motor vehicle front end assembly, a pair of wheels, spindles for the wheels, an axle joining them, and linkage means connecting one of the spindles to an end of the axle which allows automatic restoration of the wheels to a condition of parallelism from one of non-parallelism, when the vehicle runs forwardly, changes in the condition of parallelism being accompanied by changes in the distance between the wheels.

3. In a self-aligning vehicle axle assembly, a pair of wheels, spindles for the wheels, an axle connecting them, and aligning means connecting a spindle and the axle to allow automatic alignment of the wheels by bodily varying the distance between them.

4. In a self-aligning vehicle axle assembly, a pair of wheels, an axle connecting them, and a pivoted block connecting the axle to one of the wheels to automatically change the forward and backward relationship of one wheel with respect to the axle, as the alignment of the wheels varies.

5. In a motor vehicle front end assembly, an axle having wheel spindles at its ends, and a connecting block connecting a spindle to the axle so that the spindles may bodily approach or recede from each other as running conditions vary.

6. In a motor vehicle front end assembly, an axle having wheel spindles at its ends, one of the spindles being connected to the axle by a pivoted block so that the spindles may bodily approach or recede from each other as running conditions vary, said spindles having steering arms connected thereto, and a non-extensible tie-rod connecting the steering arms.

7. In a motor vehicle front end assembly, an axle, a wheel-supporting spindle pivotally connected to one end of the axle, a crank arm connected to said spindle to cause turning of same about its pivotal connection to the axle, a block pivotally connected to the opposite end of the axle, a wheel-supporting spindle pivotally connected to said block, a crank arm connected to the second mentioned spindle to cause turning thereof about an axis transverse to the longitudinal dimension of the block, and a rigid tie-rod connecting the crank arms to cause turning of the wheels when steering the vehicle.

8. A front end assembly comprising means for turnably connecting the front wheels of a motor vehicle, said means comprising an axle, a pair of substantially horizontal spindles, a rigid tie-rod, and a pair of crank arms pivotally connected to the tie-rod, one of the crank arms being rigidly connected to one of the spindles, and said spindle being pivotally connected to an end portion of the axle, the other crank arm being rigidly connected to the second spindle which is pivotally connected to the second end of the axle by an intermediate means which allows the second mentioned spindle to move pivotally and bodily with relation to the adjacent end of the axle.

ROY D. SMITH.